(12) United States Patent
Hession et al.

(10) Patent No.: US 11,794,450 B2
(45) Date of Patent: Oct. 24, 2023

(54) POLYMER-LAMINATED METAL LID

(71) Applicant: Altria Client Services LLC, Richmond, VA (US)

(72) Inventors: Christopher J. Hession, Mechanicsville, VA (US); Drew Wilkins, Richmond, VA (US); Todd McCandless, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 17/126,642

(22) Filed: Dec. 18, 2020

(65) Prior Publication Data

US 2022/0194054 A1    Jun. 23, 2022

(51) Int. Cl.
*B32B 15/09* (2006.01)
*B32B 15/092* (2006.01)
(Continued)

(52) U.S. Cl.
CPC ............. *B32B 15/09* (2013.01); *B32B 7/12* (2013.01); *B32B 15/085* (2013.01); *B32B 15/092* (2013.01); *B32B 15/18* (2013.01); *B32B 37/1207* (2013.01); *B32B 2250/03* (2013.01); *B32B 2255/06* (2013.01); *B32B 2255/26* (2013.01); *B32B 2274/00* (2013.01); (Continued)

(58) Field of Classification Search
None
See application file for complete search history.

(56) References Cited

U.S. PATENT DOCUMENTS 4,122,964 A * 10/1978 Morris ................. B65D 51/145
                                                          215/276
4,291,092 A *  9/1981 Weiner ................... B32B 27/32
                                                          525/240
(Continued)

FOREIGN PATENT DOCUMENTS

CN         2417524 Y     1/2001
DE         4328016 A1    3/1994
(Continued)

OTHER PUBLICATIONS

Deshwal—metal packaging—common metals for packaging—J. Food Sci.Tech.—Jul. 2020 (Year: 2020).*
(Continued)

*Primary Examiner* — John Vincent Lawler
(74) *Attorney, Agent, or Firm* — Harness, Dickey & Pierce, P.L.C.

(57) ABSTRACT

At least some example embodiments relate to a container including a body and a lid. The body includes a base, a side wall, and an interior region at least partially defined by the base and the side wall. The lid includes a lid wall and a skirt that extends from a periphery of the lid wall. The skirt engages the body to retain the lid on the body. The skirt cooperates with the lid wall to define a cavity. The lid is formed from a laminate including a metal layer and a polymer layer coupled to the metal layer. The polymer layer is disposed inside of the metal layer with respect to the cavity. A portion of the body is disposed inside the cavity when the container is in a closed configuration. At least some example embodiments relate to a forming of manufacturing the lid.

23 Claims, 11 Drawing Sheets

(51) Int. Cl.
 B32B 15/18 (2006.01)
 B32B 37/12 (2006.01)
 B32B 15/085 (2006.01)
 B32B 7/12 (2006.01)

(52) U.S. Cl.
 CPC ..... *B32B 2307/732* (2013.01); *B32B 2323/04* (2013.01); *B32B 2323/10* (2013.01); *B32B 2363/00* (2013.01); *B32B 2367/00* (2013.01); *B32B 2435/02* (2013.01); *B32B 2439/66* (2013.01)

(56) References Cited

U.S. PATENT DOCUMENTS

| | | | | |
|---|---|---|---|---|
| 4,423,823 | A | * | 1/1984 | Franek ................ B65D 7/36 156/203 |
| 4,600,737 | A | * | 7/1986 | Georgalas ............ C08F 283/00 428/35.8 |
| 4,664,982 | A | | 5/1987 | Genovese et al. |
| 4,686,152 | A | * | 8/1987 | Matsubayashi ......... B65D 1/28 428/626 |
| 4,833,022 | A | | 5/1989 | Bridges et al. |
| 4,935,079 | A | * | 6/1990 | Nelson-Ashley ..... B32B 15/085 156/224 |
| 4,946,743 | A | * | 8/1990 | Winter ................ B32B 27/322 428/483 |
| 5,006,383 | A | * | 4/1991 | Achille ................ B32B 15/08 220/915 |
| 5,049,443 | A | | 9/1991 | Kuszaj et al. |
| 5,167,706 | A | | 12/1992 | Kuszaj |
| 5,358,792 | A | * | 10/1994 | Mehta ................ B32B 27/08 428/483 |
| 8,052,004 | B2 | * | 11/2011 | Cheng ............... B65D 43/0202 220/323 |
| 9,662,863 | B2 | | 5/2017 | Lorenzetti et al. |
| 2007/0196665 | A1 | | 8/2007 | Tenra et al. |
| 2009/0230003 | A1 | | 9/2009 | Thiellier |
| 2011/0097562 | A1 | | 4/2011 | Brill et al. |
| 2011/0135870 | A1 | | 6/2011 | Gleich et al. |
| 2012/0167902 | A1 | * | 7/2012 | Macko ................ B65B 63/02 131/355 |
| 2019/0202608 | A1 | * | 7/2019 | Evans ............... B65D 43/0222 |
| 2019/0359398 | A1 | * | 11/2019 | Shimoji ............... B65D 53/04 |

FOREIGN PATENT DOCUMENTS

| | | | |
|---|---|---|---|
| DE | 19814018 A1 | 9/1999 | |
| EP | 2045072 A1 | 4/2009 | |
| EP | 2230330 A1 | 9/2010 | |
| JP | H01/254540 | * 10/1989 | .............. B65D 1/12 |
| JP | H11/152159 | * 6/1999 | ............ B65D 17/28 |
| KR | 10-2009-0020292 A | 2/2009 | |
| KR | 10-2009-0113415 A | 11/2009 | |
| WO | WO 1998/52833 | * 11/1998 | ............ B65D 41/04 |
| WO | WO-2009/112172 A1 | 9/2009 | |
| WO | WO-2010/106189 A1 | 9/2010 | |

OTHER PUBLICATIONS

Momotome—JP_H01-254540_A—MT—container w-metal lid—1989 (Year: 1989).*
Nakamura—JP H11-152159_A—MT—cover for container—1999 (Year: 1999).*
Free Dictionary—Laminate—definition of laminate—Jun. 7, 2022 (Year: 2022).*
Dictionary.com—Laminate Definition & Meaning—Jun. 7, 2022 (Year: 2022).*
Rueppel et al., "Keramik/Metall/Polymer—Verbunde fuerMultilayer-Multichip-Module", 1991.
Hui-xuan Zhang et al.,"Application of a Steel-Plastic-Ceramic Composite Centrifugal Pump with Good Corrosion—and Wear-resistance" 2011.

* cited by examiner

POLYMER-LAMINATED METAL LID

BACKGROUND

Field

At least some example embodiments relate to packaging for consumable articles. In at least one example embodiment, the consumable articles are tobacco products.

Description of Related Art

Some tobacco and non-tobacco articles are packaged in containers that provide portability for the consumer. The containers may be configured to be repeatedly opened and closed for removal of selected portions of the tobacco articles over a period of time. Certain smokeless tobacco articles (e.g., snuff tobacco) are packaged into bodies that are commonly referred to as "cans" or "tins." Each of the containers may cooperate with a lid to define a compartment into which the tobacco articles may be stored.

In some circumstances, the smokeless tobacco articles may be stored in a manner that permits excessive moisture migration into or out of the container. Some moist snuff tobacco articles may be retained in containers in a manner that permits moisture from the tobacco articles to come into contact with the lid of the body.

SUMMARY

At least some example embodiments relate to a lid for a container body. The lid includes a wall and a skirt. The skirt extends from a periphery of the wall. The skirt is configured to engage the container body to retain the lid on the container body. The skirt cooperates with the wall to define a cavity. The lid is formed from a laminate including a metal layer and a polymer layer coupled to the metal layer. The polymer layer is disposed inside of the metal layer with respect to the cavity.

In at least one example embodiment, the polymer layer is configured to directly engage the container body and be in fluid communication with an interior region of the container body.

In at least one example embodiment, the metal layer includes tin, steel, stainless steel, aluminum, or any combination thereof.

In at least one example embodiment, the steel includes tin-free steel.

In at least one example embodiment, the metal layer includes tin-plated steel.

In at least one example embodiment, the polymer layer includes a thermoplastic polymer.

In at least one example embodiment, the thermoplastic polymer includes polyester terephthalate (PET), polypropylene (PP), polyethylene (PE), or any combination thereof.

In at least one example embodiment, the polymer layer includes a first sublayer and a second sublayer. The second sublayer is coupled to the metal layer.

In at least one example embodiment, the second sublayer includes a thermal lamination material.

In at least one example embodiment, the first sublayer includes polyester terephthalate (PET), polypropylene (PP), or a combination of PET and PP. The second sublayer includes polyethylene (PE) or a PP copolymer.

In at least one example embodiment, the laminate further includes an enamel layer disposed on a surface of the polymer layer such that the polymer layer is disposed between the metal layer and the enamel layer. The enamel layer is configured to directly engage the container body and be in fluid communication with an interior region of the container body.

In at least one example embodiment, the enamel layer includes a phenolic, an epoxy, or an epoxy-phenolic.

In at least one example embodiment, the enamel layer includes the epoxy-phenolic.

In at least one example embodiment, the polymer layer is directly coupled to the metal layer.

In at least one example embodiment, the lid further includes an adhesive layer disposed between the metal layer and the polymer layer.

In at least one example embodiment, the lid further includes a projection extending radially inwardly from the skirt. The projection is configured to engage the container body.

In at least one example embodiment, the projection is a circumferential projection extending substantially continuously around an inside surface of the skirt.

At least some example embodiments relate to a container including a body and a lid. The body includes a base, a side wall, and an interior region at least partially defined by the base and the side wall. The lid includes a lid wall and a skirt. The skirt extends from a periphery of the lid wall. The skirt is configured to engage the body to retain the lid on the body. The skirt cooperates with the lid wall to define a cavity. The lid is formed from a laminate including a metal layer and a polymer layer coupled to the metal layer. The polymer layer is disposed inside of the metal layer with respect to the cavity. A portion of the body is configured to be disposed inside the cavity when the body is in a closed configuration.

In at least one example embodiment, the body further includes a connection rim extending axially from the side wall. The connection rim is configured to engage the lid.

In at least one example embodiment, the connection rim defines an indentation configured to permit fluid flow between the interior region and an exterior region of the container when the lid engages the body such that the container is in the closed configuration.

In at least one example embodiment, the lid is configured to engage the connection rim in a friction fit.

In at least one example embodiment, the body further includes a first projection. The first projection extends radially outwardly from the connection rim. The lid further includes a second projection. The second projection extends radially inwardly from the skirt. The first projection and the second projection are configured to engage one another to retain the lid on the body.

At least some example embodiments relate to a method of forming a lid for a container body. The method includes preparing a laminate sheet by laminating a polymer sheet onto a metal sheet. The method further includes separating a portion of the laminate sheet from a remainder of the laminate sheet. The lid further includes forming the portion into the lid. The lid includes a wall and a skirt. The skirt extends from a periphery of the wall. The skirt is configured to engage the container body to retain the lid on the container body. The skirt cooperates with the wall to define a cavity. A polymer layer of the lid is disposed inside of a metal layer of the lid with respect to the cavity.

In at least one example embodiment, the preparing includes heat bonding the polymer sheet to the metal sheet.

In at least one example embodiment, the method further includes providing the polymer sheet. The polymer sheet includes polyethylene terephthalate (PET), polypropylene (PP), a polyethylene (PE), or any combination thereof.

In at least one example embodiment, the providing includes co-extruding a first polymeric sublayer and a second polymeric sublayer. The first polymeric sublayer includes PET, PP, or both PET and PP. The second polymeric sublayer includes PE or a PP copolymer.

In at least one example embodiment, the forming includes stamping, pressing, hydroforming, or any combination thereof.

In at least one example embodiment, the method further includes applying an enamel to the polymer sheet after the preparing. The enamel includes a phenolic, an epoxy, or an epoxy-phenolic.

In at least one example embodiment, the separating includes die cutting.

In at least one example embodiment, the method further includes providing the metal sheet prior to the preparing. The metal sheet has a thickness ranging from 0.0062 inches to 0.0141 inches.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1A:
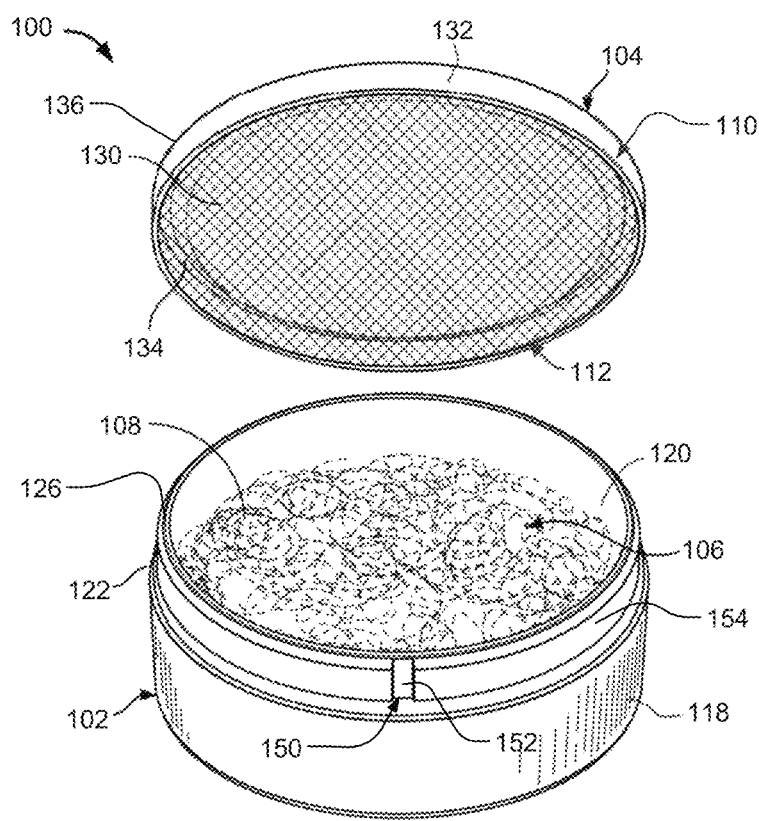
FIG. 1A is a perspective view of a container according to at least one example embodiment, the container in an open configuration.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the words "generally" or "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a perspective view of a container according to at least one example embodiment, the container being in an open configuration.

In at least some example embodiments, a container 100 includes a body 102 and a lid 104. The container 100 may be used for the storage of an oral product 106. The body 102 defines an interior region 108 into which the oral product 106 may be disposed. The lid 104 cooperates with the body 102 to close the container 100 and retain the oral product 106 within the interior region 108. The container 100 may be repeatedly shifted between an open configuration and a closed configuration, as will be described in greater detail with respect to FIGS. 2A-2C.

In at least some example embodiments, the lid 104 includes a first portion or layer 110 and a second portion or layer 112. The second portion 112 may be disposed on an inside of the first portion 110 such that it faces and is exposed to the interior region 108. In at least one example embodiment, the second portion 112 is positioned between the interior region 108 of the body 102 and the first portion 110 to isolate the interior region 108 from the first portion 110.

The first and second portions 110, 112 of the lid 104 may comprise different materials. More particularly, the first portion 110 may include a first material and the second portion 112 may include a second distinct material. In at least some example embodiments, the first and second materials may be independently selected from metals, polymers, fiberboards, or any combination thereof. In at least some example embodiments, the lid 104 may be formed from a laminate including one or more layers of the first material and one or more layers of the second material. In at least one example embodiment, the laminate includes a single layer of the first material and a single layer of the second material.

In at least some example embodiments, the first portion 110 includes a metal and the second portion 112 includes a polymer. Accordingly, the first portion 110 may be referred to as a metal portion 110 and the second portion 112 may be referred to as a polymer portion 112. In at least one other example embodiment, the first portion 110 includes a first polymer and the second portion 112 includes a second distinct polymer. In yet another example embodiment, the first portion 110 includes a fiberboard and the second portion 112 includes a polymer.

In at least some example embodiments, the second material of the polymer portion 112 includes a polymeric material. In at least one example embodiment, the polymer portion 112 consists essentially of the polymeric material. In at least one example embodiment, the polymeric material is suitable for storing the oral product 106, such as a tobacco product having one or more flavorings or volatile agents, as will be discussed in greater detail below. The polymeric material may have sufficient flexibility to withstand manufacturing of the lid 104 without substantially cracking, wrinkling, or delaminating from the metal portion 110. Furthermore, the polymeric material may be configured to remain intact so as to substantially cover the metal portion 110 even when other coatings become damaged (see, e.g., enamel portion 416 of FIG. 4).

Figure 3A:
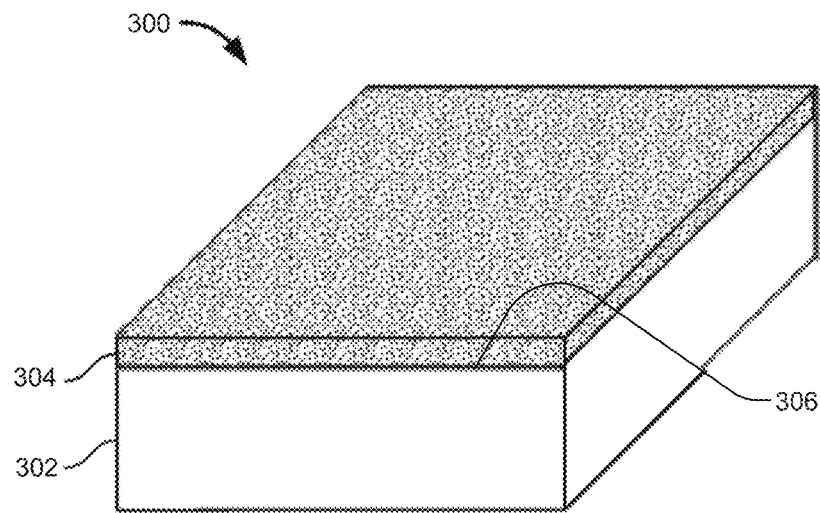
FIG. 3A is a partial perspective view of a multi-layer polymer material according to at least some example embodiments.
Figure 3B:
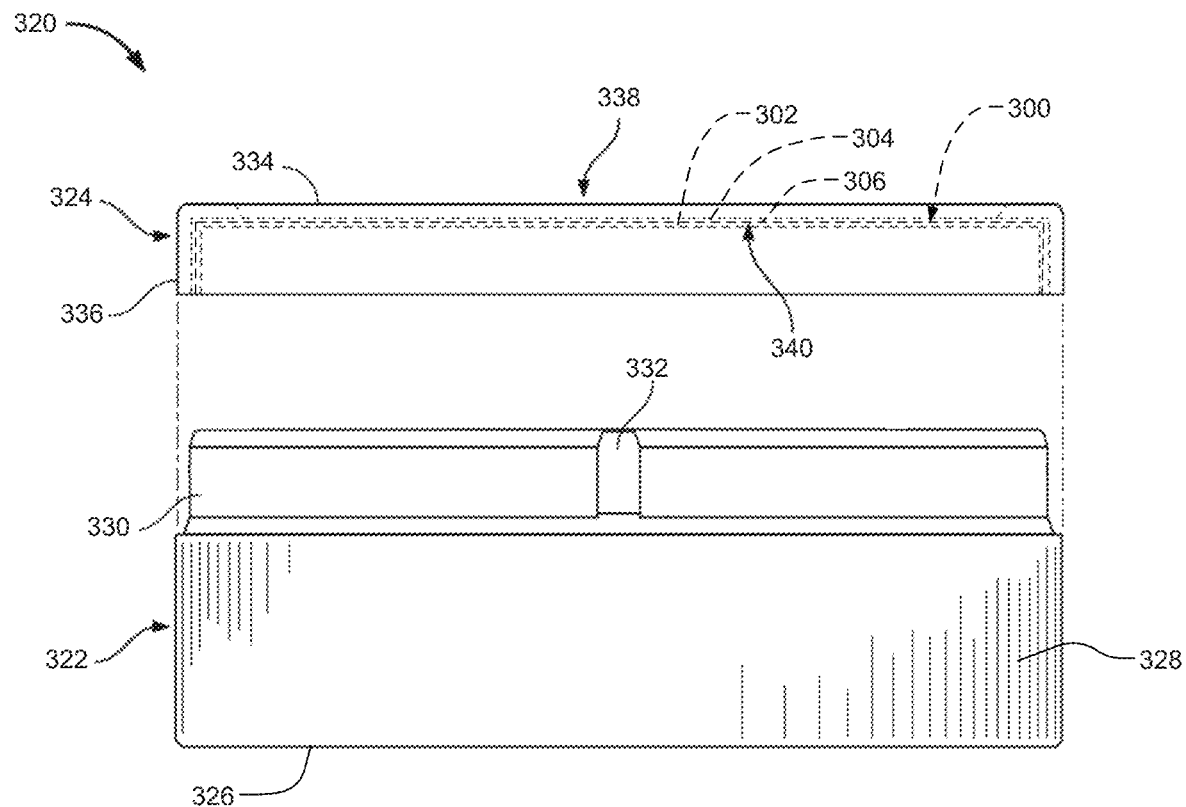
FIG. 3B is a side view of another container according to at least one example embodiment, the container having a lid including the multi-layer polymer material of FIG. 3A.

In at least some example embodiments, the polymer portion 112 includes a single substantially homogeneous layer. The polymeric material may include one or more homopolymers, one or more copolymers, or any combination of homopolymer(s) and copolymer(s). In at least some example embodiments, the polymer includes a thermoplastic polymer. In at least some example embodiments, the polymer includes polyethylene terephthalate (PET), polypropylene (PP), a polyethylene (PE), or any combination thereof. In at least some other example embodiments, the polymer portion 112 is a multi-layer polymer portion having two or more distinct polymeric layers, as will be discussed in greater detail below (FIGS. 3A-3B).

In at least some example embodiments, the first material of the metal portion 110 comprises a metallic material that is suitable for bonding, adhering, or otherwise affixing to the polymer portion 112. In at least one example embodiment, the metal portion consists essentially of the metallic material. In at least some example embodiments, the metallic material may include aluminum, tin, steel, stainless steel, or any combination thereof. In at least one example embodiment, the steel includes tin-free steel. In at least one other example embodiment, the steel includes tin-plated steel. In at least one example embodiment, the metal portion 110 is formed from a metal base sheet.

The polymer portion 112 can be coupled, affixed, or bonded to an interior side of the metal portion 110. The polymer portion 112 may be coupled to the metal portion 110 by an adhesive, solvent, or heat, such as when the polymer portion 112 is or includes a heat-sealable polymer, or any combination thereof.

In at least one example embodiment, an interface or seal between the metal and polymer portions 110, 112 may be non-hermetic. In at least some example embodiments, the seal may be non-hermetic when the polymer portion 112 is permeable by atmospheric gases. The polymer portion 112 may be made of a material that permits oxygen, methane, carbon dioxide, nitrogen, and/or another other gases to pass therethrough in at least a limited quantity. Accordingly, oxygen, methane, carbon dioxide, nitrogen, and/or other gases may, in at least some embodiments, pass from the interior region 108 of the container 100 to a surrounding exterior environment through the polymer portion 112 of the lid 104 while the container 100 is in the closed configuration. Any elements shown and not described will be described discussions of later figures.

Figure 1B:
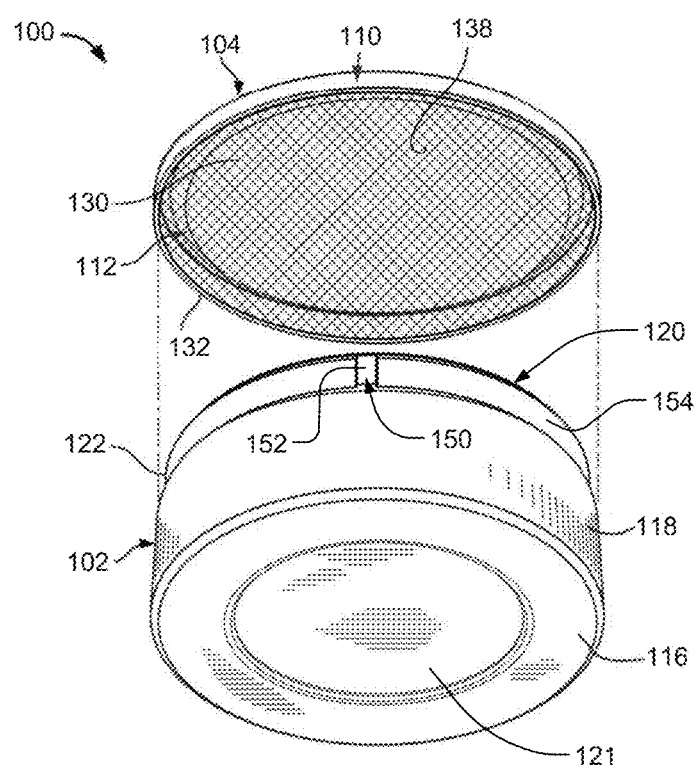
FIG. 1B is an exploded perspective view of the container of FIG. 1A.

FIG. 1B is an exploded perspective view of the container of FIG. 1A.

In at least one example embodiment, as shown in FIG. 1B, the body 102 may include a base 116, a side wall 118, and an opening 120. In at least one example embodiment, the base 116 includes a depression 121. The depression 121 may extend axially-inwardly toward the interior region 108, as shown in FIG. 1A, of the body 102. In at least one example embodiment, the body 102 has a generally cylindrical shape. The base 116 and opening 120 may therefore be substantially circular and the side wall 118 may be substantially cylindrical. In at least one example embodiment, the body may include different geometries, such as a substantially rectangular, substantially oval in cross section (not shown), or combinations of rectangular and curved geometries. In at least one example embodiment, the body is asymmetric.

In at least one example embodiment, the body 102 may further include a connection rim 122 projecting axially from the side wall 118 such that the side wall 118 is disposed between the base 116 and the connection rim 122. The connection rim 122 is configured to engage the lid 104 and retain the lid 104 on the body 102. The connection rim 122 may extend around at least a portion of the side wall 118, such as the entire side wall 118, to at least partially define the opening 120. The base 116, the side wall 118, and the connection rim 122 may cooperate to at least partially define the interior region 108 (FIG. 1A). Any elements shown and not described will be described discussions of later figures.

Figure 1C:
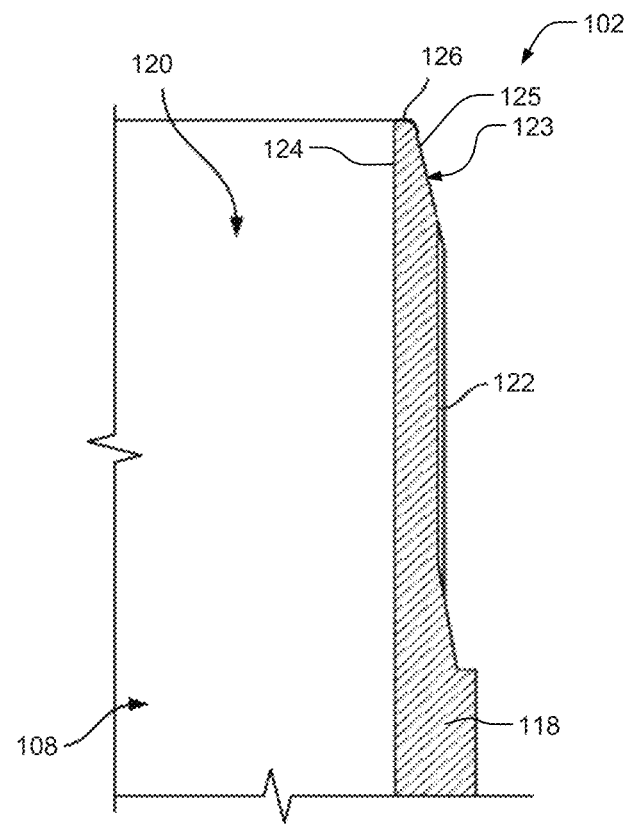
FIG. 1C is a partial sectional view of a body of the container of FIG. 1A taken at line 1C-1C of FIG. 1F.

FIG. 1C is a partial sectional view of a body of the container of FIG. 1A.

In at least one example embodiment, as shown in FIG. 1C, a proximal end of the connection rim 122 may be adjacent to the side wall 118. The connection rim 122 may include a tapered portion 123 adjacent to a distal end. In at least some example embodiments, an inside surface 124 of the tapered portion 123 may be substantially aligned with a remainder of the connection rim 122 such that it extends substantially parallel to a longitudinal axis of the body 102. An outside surface 125 of the tapered portion 123 may be disposed at an angle with respect to a remainder of the connection rim 122.

The distal end of the connection rim 122 may include an upper face 126. The upper face 126 is configured to be disposed adjacent to the lid 104. In at least some embodiments, the connection rim 122 is integrally formed with the side wall 118.

In at least one example embodiment, the body 102 may be constructed from a material that is suitable for storing the oral product 106 (as shown in FIG. 1A), such as tobacco products having one or more flavorants or volatile agents. In at least some example embodiments, the body 102 may be constructed from a polymeric material, a fiberboard, metallic material, or any combination thereof. Metallic materials may include aluminum, tin, steel (e.g., tin-free steel, tin-plated steel), stainless steel, or any combination thereof. Polymeric materials may include polyester terephthalate (PET), polypropylene (PP), polyethylene (PE), or any combination thereof. In at least one example embodiment, the body 102 is made of a moldable polymer material.

Figure 1D:
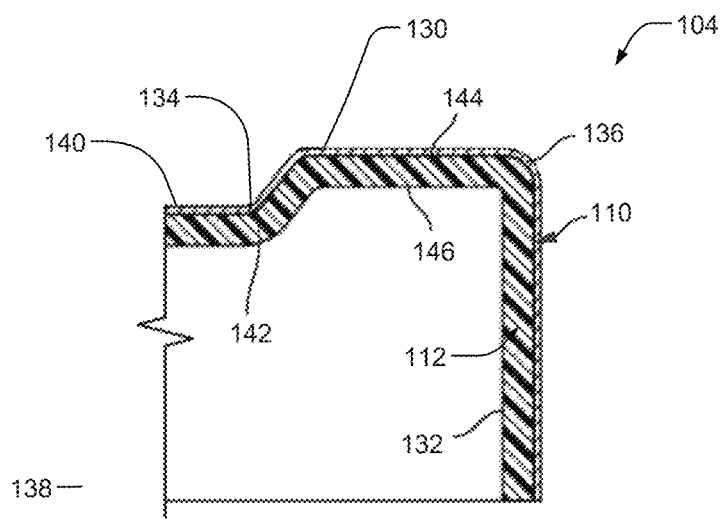
FIG. 1D is a partial sectional view of a lid of the container of FIG. 1A.

FIG. 1D is a partial sectional view of a lid of the container of FIG. 1A.

In at least one example embodiment, as shown in FIG. 1D, the lid 104 may generally include a lid wall 130 and a skirt 132. The lid wall 130 and the skirt 132 may be a single piece. In at least one example embodiment, the lid wall 130 is substantially planar. However, a lid may alternatively have other shapes, such as a domed shape. In at least one example embodiment, the lid wall 130 defines a depression 134. The depression 134 may extend axially inwardly. That is, the depression 134 may extend toward the interior region 108 of the body 102 when the container 100 is in the closed configuration. The skirt 132 may extend from a periphery 136 of the lid wall 130. In at least some embodiments, the skirt 132 may extend substantially perpendicular to the lid wall 130.

With continued reference to FIG. 1D, the lid wall 130 and the skirt 132 may cooperate to at least partially define a cavity 138. The polymer portion 112 may be disposed inside of the cavity 138. Accordingly, the polymer portion 112 may be disposed adjacent to the cavity 138, such that the polymer portion 112 is between the metal portion 110 and the cavity 138.

Figure 1E:
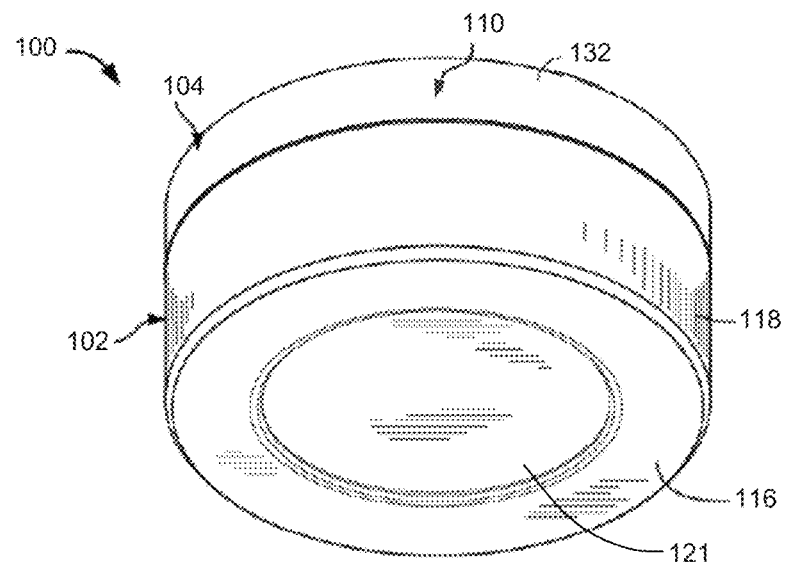
FIG. 1E is a perspective view of the container of FIG. 1A, the container in a closed configuration.

FIG. 1E is a perspective view of the container of FIG. 1A, the container being in a closed configuration.

Figure 5A:
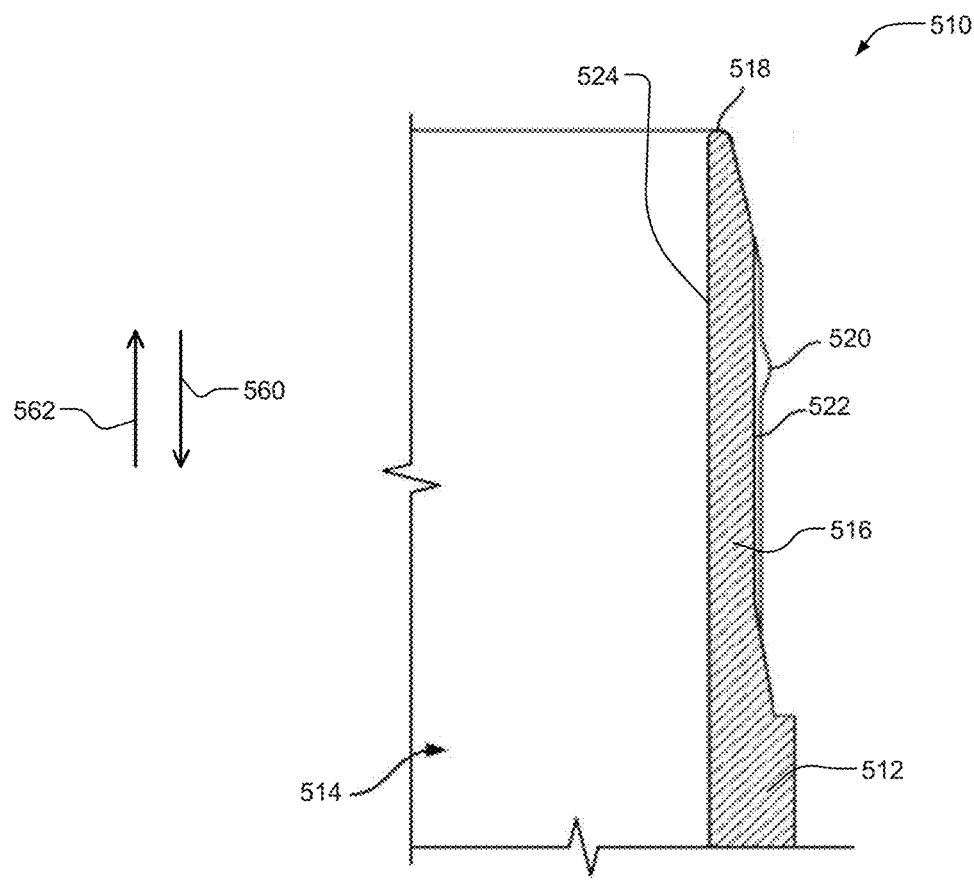
FIG. 5A is a partial sectional view of a body according to at least one example embodiment.
Figure 5B:
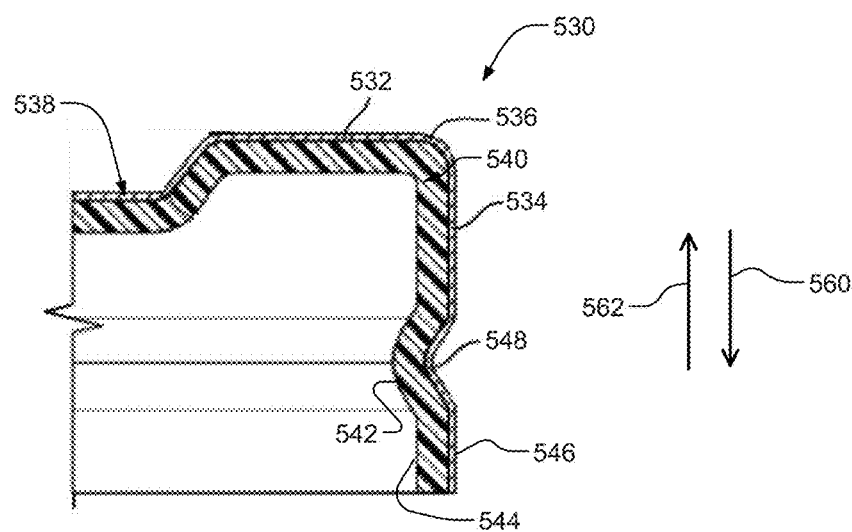
FIG. 5B is a partial sectional view of a lid according to at least one example embodiment, the lid being configured to cooperate with the body of FIG. 5A in a snap fit engagement.

In at least one example embodiment, as shown in FIG. 1E, the container 100 can be assembled into the closed configuration so that the body 102 has a friction- or press-fit engagement with the lid 104. In at least some example embodiments, the body 102 and/or lid 104 may include different or additional engagement features, such as one or more of threads, a slide-lock, or protrusions and/or depressions to facilitate a snap-fit as shown in FIGS. 5A-5B and described herein.

In at least one example embodiment, the skirt 132 is configured to engage the body 102 to releasably couple the lid 104 to the body 102, thereby enclosing the oral product 106 (shown in FIG. 1A) in the container 100 when the container 100 is in the closed configuration. In at least some example embodiments, the skirt 132 is configured to engage the connection rim 122 (FIG. 1A). In the closed configuration, the polymer portion 112 (FIG. 1A) may engage the body 102. In at least some example embodiments, the polymer portion 112 may directly engage the body 102.

Figure 1F:
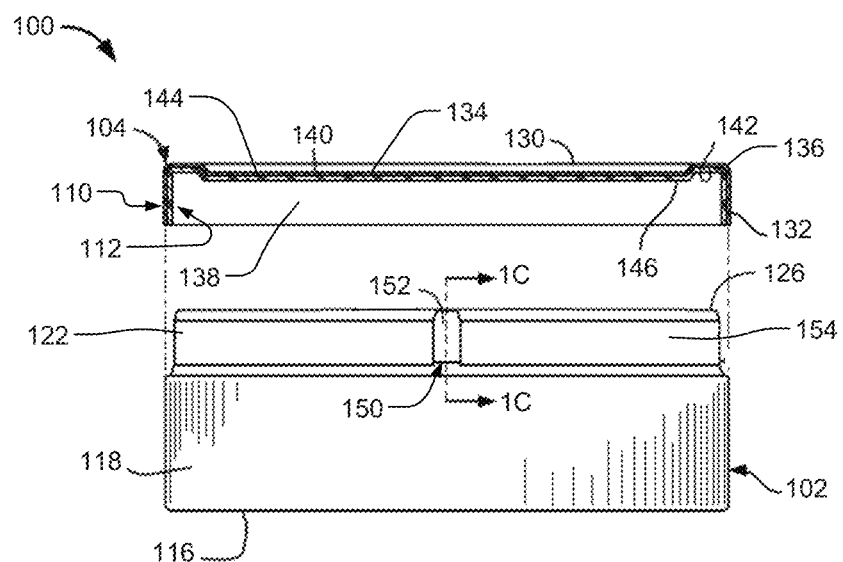
FIG. 1F is a side view of the container of FIG. 1A.

FIG. 1F is a side view of the container of FIG. 1A.

In at least one example embodiment, as shown in FIG. 1F, the metal portion 110 of the lid 104 may include a first outer surface 140 and a first inner surface 142. The polymer portion 112 of the lid 104 may include a second outer surface 144 and a second inner surface 146. The first outer surface 140 may be disposed on an exterior of the container 100. The second outer surface 144 may be coupled to the first inner surface 142. The second inner surface 146 may be disposed toward the interior region 108 of the body 102. In at least some example embodiments, the second inner surface 146 is in fluid communication with the interior region 108.

In at least some example embodiments, in the closed configuration, the friction- or press-fit between the body 102 and the lid 104, may urge the lid wall 130 toward the body 102, thereby at least partially compressing the polymer portion 112 between the metal portion 110 and the body 102, and more particularly, between the metal portion 110 and the upper face 126 of the body 102. In at least one example embodiment, the polymer portion 112 may further include a ring-shaped structure projecting from the second inner surface 146 and configured to abut the connection rim 122 of the body 102.

In at least one example embodiment, as shown in FIG. 1F, the container 100 includes one or more vent structures 150 arranged to at least partially control the limited gas exchange provided by a non-hermetic seal, such as a seal between the polymer portion 112 and the body 102 when in the closed configuration. The vent structures 150 may be disposed on the body 102. More particularly, the vent structures 150 may be disposed on the connection rim 122.

In at least one example embodiment, each of the vent structures 150 includes an indentation 152 formed in an outer surface 154 of the connection rim 122. The indentation 152 interrupts the outer surface 154 so that the outer surface 154 is discontinuous about its circumference. The indentations 152 may extend between the side wall 118 and the upper face 126 of the connection rim 122. Due to the presence of the vent structures, when the container is in the closed configuration, the lid 104 may not fully engage the connection rim 122 of the body 102, thereby facilitating a limited exchange of gases past the polymer portion 112.

In addition to providing a pathway for limited gas exchange, in at least some example embodiments, the vent structures 150 facilitate continuous engagement between the body 102 and the lid 104. More particularly, when the lid 104 is pressed onto the connection rim 122 of the body to place the body in the closed configuration (as shown in FIG. 1E), a portion of the air in the interior region 108 of the body 102 may escape through the vent structures 150 so as to reduce the likelihood of trapping excessive air inside the body 102. In at least some example embodiments, the vent structures 150 include alternative features that are configured to fluidly connect the interior region 108 to an exterior region of the container 100, such as apertures or valves. In at least one other example embodiment, the connection rim 122 is uninterrupted.

In at least one example embodiment, the oral product 106 is an oral tobacco product or an oral non-tobacco product. The oral product 106 may include chewing tobacco, snus, moist snuff tobacco, dry snuff tobacco, or other smokeless tobacco and non-tobacco products for oral consumption. A smokeless tobacco product may include tobacco that is whole, shredded, cut, granulated, reconstituted, cured, aged, fermented, pasteurized, or otherwise processed. Tobacco may be present as portions of leaves, flowers, roots, stems, extracts, or any combination thereof. In at least one example embodiment, the oral product 106 includes a tobacco extract, such as a tobacco-derived nicotine extract (e.g., white snus) alone or in combination with non-tobacco cellulosic materials. Where the oral product 106 includes nicotine, with or without tobacco, the nicotine may be tobacco-derived nicotine or synthetic nicotine. The oral product 106 may be provided loose, in a pouch, as a plug or twist, or in a desired shape.

The oral product 106 may have various ranges of moisture. In at least one example embodiment, the oral product 106 is a dry oral product having a moisture content ranging from 5% by weight to 10% by weight. In at least one example embodiment, the oral product 106 has a medium moisture content, such as a moisture content ranging from 20% by weight to 35% by weight. In at least one example embodiment, the oral product 106 is a wet oral product having a moisture content ranging from 40% by weight to 55% by weight.

Smokeless tobacco, such as smokeless tobacco in the oral product 106 may include tobacco that is whole, shredded, cut, cured, aged, fermented, pasteurized, pouched, or otherwise processed. In at least one example embodiment, the smokeless tobacco may include portions of leaves, flowers, roots, stems, or extracts thereof of any member of the genus *Nicotiana*. Further, the tobacco may include an extract of tobacco that provides additional tobacco constituents, such as flavors, aromas, alkaloids, or the like. In at least one example embodiment, the smokeless tobacco product may include one or more elements such as flavor extracts, flavor masking agents, bitterness receptor site blockers, receptor site enhancers, sweeteners, additives, or combinations thereof. Additives may include chlorophyll, minerals, botanicals, or breath-freshening agents, or any combination thereof. In at least one example embodiment, a non-tobacco product may include synthetic nicotine.

In at least one example embodiment, the tobacco product is a moist snuff tobacco product. The moist snuff tobacco may comprise shredded or cut tobacco that is processed to have substantial moisture content. In at least one example embodiment, the moist snuff tobacco product may have a moisture content at final packaging of greater than or equal to 40% by weight, optionally ranging from 45% by weight to 65% by weight, optionally ranging from 50% by weight to 60% by weight, or optionally 55% by weight.

The polymer portion 112 of the lid 104 can serve as a moisture barrier between the oral product 106 and the metal portion 110 of the lid 104. More particularly, in at least one example embodiment, the polymer portion 112 may reduce and/or prevent interaction between moisture from the oral product 106 and the metal portion 110. The polymer portion 112 of the lid 104 may therefore protect the metal portion 110 of lid 104 from moisture and/or other compounds of the oral products 106 that are enclosed in the container 100. Accordingly, in at least some example embodiments, the polymer portion 112 can reduce and/or prevent corrosion or oxidation (e.g., rusting) of the metal portion 110. In at least one example embodiment, the polymer portion 112 may also protect the oral product 106 from chemically interacting with the lid 104, such as by picking up metallic or other flavoring from contact with the lid 104.

The container 100 may further include additional features. In at least some example embodiments, the container 100 may include text (e.g., information, identifying language), ornamental designs, other indicia (e.g., logo, touch-identifiable pattern), and/or functional features (e.g., grip-enhancing texture). In at least one example embodiment, the lid 104 includes text, ornamental designs, other indicia, and/or functional features. Such features may be formed via embossing, debossing, printing, and/or applying a label, in at least some example embodiments.

Figure 2A:
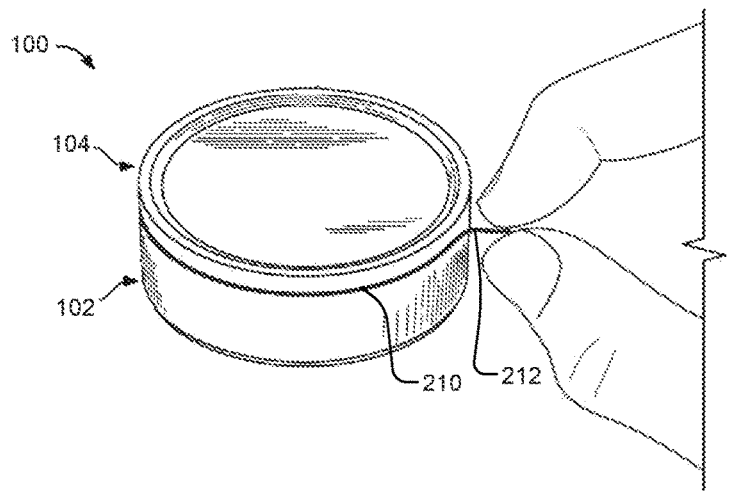
FIG. 2A is a perspective view of the container of FIG. 1A, the container in a sealed configuration.
Figure 2B:
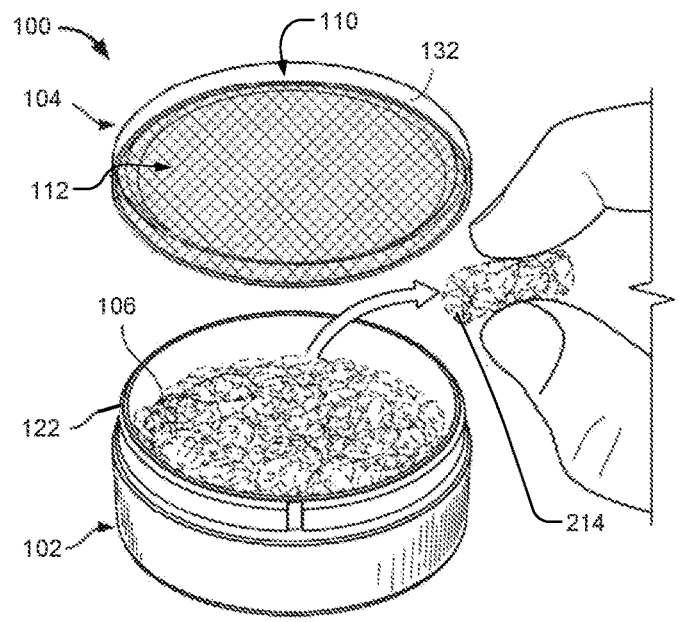
FIG. 2B is a perspective view of the container of FIG. 1A, the container in the open configuration and including an oral product.
Figure 2C:
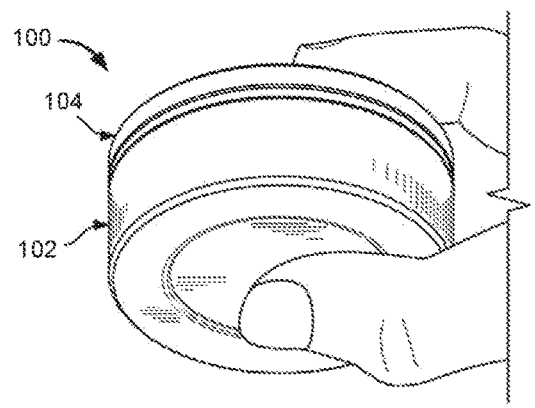
FIG. 2C is a perspective view of the container of FIG. 1A, the container in the closed configuration.

FIGS. 2A-2C depict use of the container of FIG. 1A according to at least one example embodiment. FIG. 2A is a perspective view of the container in a closed and sealed configuration.

Referring to FIG. 2A, in at least one example embodiment, the container 100 may store the oral product 106 (FIG. 2B) in a closed and sealed configuration. In at least some example embodiments, prior to opening the container 100 for the first time, an adult consumer may break a seal 210 applied to an area between the body 102 and the lid 104. The seal 210 may temporarily fix the lid 104 to the body 102. In at least some example embodiments, the seal 210 may be part of a label for graphic communication, a tear strip for sealing the lid 104 to the body 102, and/or a film seal along the connection rim 122. In at least one example embodiment, the adult consumer may break the seal 210 by pulling a tab or cord 212 that extends around a circumference of the container 100. In at least one example embodiment, the seal 210 may provide a visual tamper indicator.

FIG. 2B is a perspective view of the container in the open configuration.

With reference to FIG. 2B, the adult consumer may separate the lid 104 from the body 102 to shift the container 100 from the closed configuration to the open configuration. In at least one example embodiment, the adult consumer may remove the lid 104 from the body 102 by overcoming the friction- or press-fit engagement between the skirt 132 of the lid 104 and the connection rim 122 of the body 102. In at least some other example embodiments, the adult consumer may overcome another form of engagement, such as a snap fit (as shown and described with respect to FIGS. 5A-5B) or a threaded engagement.

In the open configuration, as shown in FIG. 2B, the adult consumer may access the oral product 106 stored in the container 100. The adult consumer may remove a portion 214 of the oral product 106, while a remainder of the oral product remains in the body 102. In at least one example embodiment, the oral product 106 includes moist snuff tobacco, and the adult consumer may pinch a portion of the snuff tobacco while the remaining portion of the moist snuff tobacco is retained in the body 102.

FIG. 2C is a perspective view of the container in the closed configuration.

Referring to FIG. 2C, in at least one example embodiment, the adult consumer may place the container 100 back in the closed configuration by replacing the lid 104 on the body 102. In at least one example embodiment, the adult consumer may return the container 100 to the closed configuration by disposing at least a portion of the connection rim 122 within the cavity 138 (shown in FIG. 1B). The adult consumer may press the skirt 132 of the lid 104 over and around the connection rim 122 of the body 102 to reengage the lid 104 with the body 102 and enclose the remaining oral product 106 within the container 100. In the closed configuration, the polymer portion 112 returns to an abutting relationship with the connection rim 122 of the body 102 (FIG. 2B).

FIG. 3A is a partial perspective view of a multi-layer polymer material used to form a lid.

With reference to FIG. 3A, in at least one example embodiment, a multi-layer polymer material 300 may include two or more distinct layers or materials, such as a first sublayer 302 and a second sublayer 304, as shown in FIG. 3A. In at least some example embodiments, the first sublayer 302 includes a base material and the second sublayer 304 includes one or more secondary materials to facilitate adhesion of the polymer material (e.g., of a polymer portion) with a metal material (e.g., of a metal portion).

The first sublayer 302 may have a first polymeric composition and the second sublayer may have a second distinct polymeric composition. In at least some example embodiments, the first polymeric composition may include polyester terephthalate (PET), polypropylene (PP), or both PET and PP. In at least some example embodiments, the second material may be a thermal lamination material that facilitates heat bonding to a metallic material of the metal portion of the lid. In at least some example embodiments, the thermal lamination material may include polyethylene (PE), a PP copolymer, or a combination of the PE and the PP copolymer.

The second sublayer 304 is disposed on and coupled to a surface 306 of the first sublayer 302. In at least some example embodiments, the second sublayer 304 is directly coupled to the first sublayer 302. The first and second sublayers 302, 304 may be coextensive. In at least some example embodiments, the first and second sublayers 302, 304 are integrally formed, such as by co-extrusion.

FIG. 3B is a side view of another container according to at least one example embodiment, the container having a lid formed from the multi-layer polymer material of FIG. 3A.

Referring to FIG. 3B, a container 320 according to at least some example embodiments is provided. The container 320 may include a body 322 and a lid 324. The body 322 may be the same as or similar to the body 102 of FIGS. 1A-1F. Accordingly, the body 322 may include a base 326, a generally cylindrical side wall 328, a connection rim 330, and one or more vent structures 332.

The lid 324 may include a lid wall 334 and a skirt 336. The lid 324 may include a first or metal portion 338 and a second or polymer portion 340. In at least some example embodiments, the polymer portion 340 may be formed from the multi-layer polymer material 300. The second sublayer 304 of the multi-layer polymer material 300, which may be a thermal lamination layer, is disposed adjacent to the metal portion 338 and coupled to the metal portion 338. In at least some example embodiments, the second sublayer 304 is directly coupled to the metal portion 338. The first sublayer 302 of the multi-layer polymer material 300 may engage the rim 330 of the body 322 and be in fluid communication with an interior region of the body 322.

In at least some example embodiments, the container 320 includes different or additional engagement features between the body 322 and the lid 324, such as to facilitate a snap fit (as shown in FIGS. 5A-5B) or a threaded engagement. In at least some example embodiments, the lid 324 includes different or additional features, such as an enamel portion (FIG. 4) and/or exterior features (e.g., decorative indicia, identifying indicia, functional features).

Figure 4:
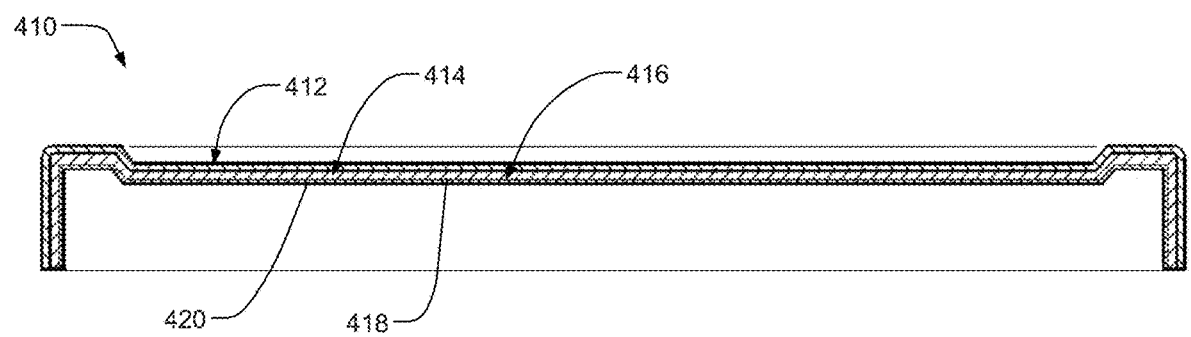
FIG. 4 is a sectional view of a lid according to at least one example embodiment.

FIG. 4 is sectional view of another lid for a container according to at least one example embodiment.

In at least one example embodiment, as shown in FIG. 4, a lid may further include an interior enamel coating. Referring to FIG. 4, a lid 410 is provided. The lid 410 may cooperate with a body, such as the body 102 of FIGS. 1A-1F, to form a container for storage of an oral product.

The lid 410 may include a first or metal portion 412, a second or polymer portion 414, and a third or enamel portion 416. The metal, polymer, and enamel portions 412, 414, 416 may be formed as layers. In at least some example embodiments, the metal portion 412 may be the metal portion 110 of the lid 104 of FIGS. 1A-1D and 1F. In at least some example embodiments, the polymer portion 414 may be the polymer portion 112 of the lid 104 of FIGS. 1A-1D and 1F. In at least one example embodiment, the polymer portion 414 may be the polymer portion 340 of the lid 324 of FIG. 3B, which includes the multi-layer polymer material 300.

The polymer portion 414 may be disposed between the metal portion 412 and the enamel portion 416. The enamel portion 416 may comprise one or more layers coupled to an inside surface 418 of the polymer portion 414. The enamel portion 416 may cover at least a portion of the inside surface 418. In at least some example embodiments, the enamel portion 416 covers substantially the entire inside surface 418.

The enamel portion 416 may be configured to be disposed toward an inside of the body. Accordingly, the enamel portion 416 may include a product contact surface 420. The enamel portion 416 may comprise a material suitable for contacting an oral product (see, e.g., the oral product of FIG. 1C). In at least some example embodiments, the enamel portion 416 may reduce or prevent the formation of rust on the metal portion 412.

In at least some example embodiments, a composition of the enamel portion 416 may be dependent upon a pH of the oral product and/or an acidity of the oral product. The enamel coating may include an epoxy, such as an epoxyphenolic, an epoxy-anhydride, an epoxy-amino; an organosol; a polyester; a phenolic; an oleoresinous; or any combination thereof. In at least one example embodiment, the enamel portion 416 includes an epoxy, a phenolic, or an epoxy phenolic. In at least one example embodiment, the enamel consists essentially of the epoxy-phenolic.

FIG. 5A is a partial sectional view of a body for another container according to at least one example embodiment.

With reference to FIG. 5A, in at least one example embodiment, a body 510 may be the same as the body 102 of FIGS., but further includes a connection rim 516 having an upper face 518 and one or more projections 520. The one or more projections 520 may extend radially outwardly from the connection rim 516. In at least one example embodiment, the one or more projections 520 comprise a single continuous circumferential projection that extends along substantially the entire outer surface 522 of the connection rim 516. In at least one other example embodiment, the one or more projections 520 comprise a plurality of projections, such as a plurality of beads. The beads may be discrete and circumferentially spaced apart along an outer surface 522 of the connection rim 516. In at least another a body may include two axially-spaced rows of projections, such as circumferentially-spaced beads or continuous circumferential projections. The projections 520 may be configured to engage a lid to couple the lid to the body 510, such as in a snap-fit engagement.

The connection rim 516 further includes an inner surface 524. In at least some example embodiments, the inner surface 524 may be smooth, as shown in FIG. 5A. In at least some other example embodiments, an inner surface of a connection rim may include a corresponding one or more depressions disposed opposite the projection 520.

FIG. 5B is a partial sectional view of a lid according to at least one example embodiment, the lid being configured to cooperate with the body of FIG. 5A in a snap-fit engagement.

FIG. 5B provides a lid 530 configured to engage the body 510 of FIG. 5A. The lid 530 generally includes a lid wall 532 and a skirt 534 extending from a periphery 536 of the lid wall 532. The lid 530 includes a first or metal portion 538 and a second or polymer portion 540 disposed inside of the metal portion 538.

In at least some example embodiments, lid 530 includes one or more projections 542. The projections 542 may extend radially inwardly from an inner surface 544 of the skirt 534. In at least one example embodiment, the one or more projections 542 may include a single continuous circumferential projection. In at least one other example embodiment, the one or more projections 542 include a plurality of discrete, circumferentially-spaced projections, such as beads. In at least one other example embodiment, the one or more projections include two rows of axially-spaced projections.

In at least some example embodiments, an outer surface 546 of the skirt 534 includes a corresponding one or more depressions 548. Therefore, the projections 542 and respective depressions 548 may be formed in both the metal portion 538 and the polymer portion 540.

With reference to FIGS. 5A-5B, a container including the body 510 and the lid 530 may be transitioned between an open configuration and a closed configuration. The projection 542 of the lid 530 may be configured to engage the projection 520 of the body 510 (FIG. 5A) to retain the lid 530 on the body 510 and maintain the container in the closed configuration. To place the container in the closed configuration, the lid 530 and the body 510 may be pressed toward one another to slide the projections 520, 542 past one another.

For example, the lid 530 may be moved in a first direction 560 with respect to the body 510. As the lid 530 is moved in the first direction 560, the skirt 534 circumferentially surrounds the connection rim 516. The projection 520 of the body 510 is initially disposed in the first direction 560 with respect to the projection 542 of the lid 530. As the lid 530 is moved in the first direction 560, the projection 542 of the lid 530 slides past the projection 520 of the body 510. As the projection 542 clears the projection 520, the lid 530 snaps into place. The lid 530 is prevented from moving substantially in a second direction 562 opposite the first direction 560 due to engagement of the projections 520, 542 with one another. The container can be returned to the open configuration by moving the lid 530 in the second direction 562 and applying at least a threshold force to slide the projection 542 of the lid 530 past the projection 520 of the body 510 in the second direction 562.

In at least some example embodiments, a snap fit may be created between a body and a lid using different or additional features. In at least one example embodiment, a lid includes a projection and a body includes a respective depression into which the projection is disposed in a closed configuration. In at least one example embodiment, a body includes a projection and a lid includes a depression into which the projection is disposed in a closed configuration.

Figure 6:
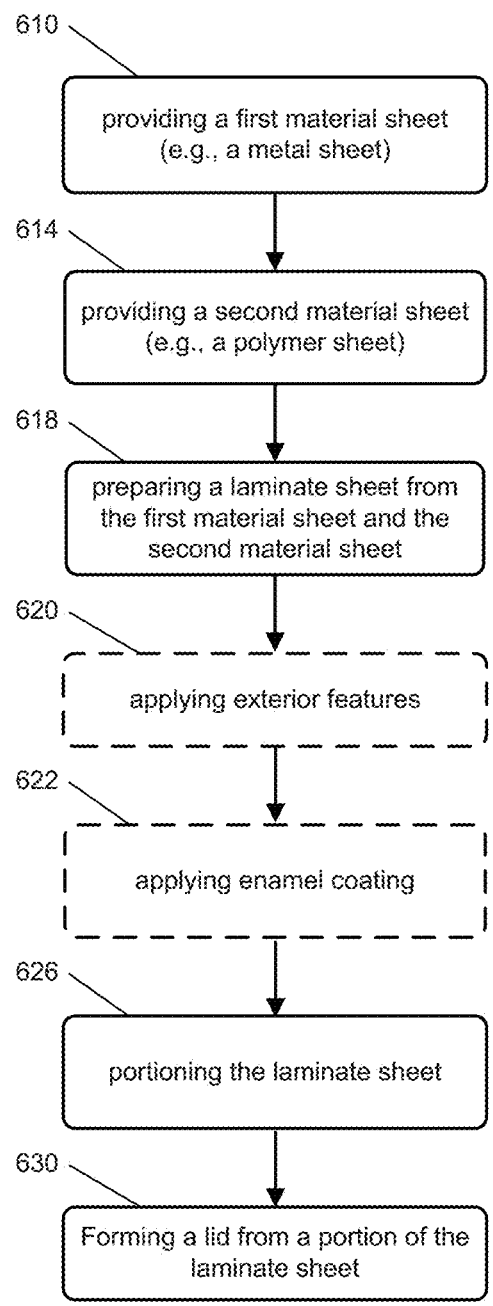
FIG. 6 is a flowchart depicting a method of manufacturing a container according to at least one example embodiment.

FIG. 6 is a flowchart depicting a method of manufacturing a lid for a container according to at least one example embodiment. The method may generally include providing a metal sheet at 610, providing a polymer sheet at 614, preparing a laminate at 618, optionally applying exterior features to the lid at 620, optionally applying an enamel coating at 622, portioning the laminate sheet at 626, and forming the lid at 630.

At 610, a first material sheet is provided. In at least some example embodiments, the first material sheet comprises a metallic material and may be referred to as a metal sheet. In at least some example embodiments, the metallic material may include aluminum, tin, steel (e.g., tin-free steel or tin-plated steel), stainless steel, or any combination thereof. In at least some other example embodiments, the first material sheet comprises a polymer or a fiberboard.

In at least some example embodiments, the metal sheet has a thickness ranging from 0.0005 inches to 0.0141 inches, optionally ranging from 0.0005 inches to 0.0015 inches, or optionally ranging from 0.0072 inches to 0.0085 inches. In at least one example embodiment, the thickness ranges from 0.0062 inches to 0.0141 inches. In at least some example embodiments, the first material sheet is provided on a roll.

At 614, a second material sheet is provided. In at least one example embodiment, the second material sheet comprises a polymeric material and is referred to as a polymer sheet. In at least one example embodiment, the polymeric material includes PET, PP, PE, or any combination thereof. In at least one example embodiment, the second material sheet is provided on a roll. In at least one example embodiment, the polymeric sheet has a substantially homogeneous composition. In at least one example embodiment, the polymeric sheet includes two or more layers having distinct compositions (see, e.g., multi-layer polymer material 300 of FIG. 3A).

In at least one example embodiment, providing a second material sheet may include forming a second material sheet. When the polymer sheet includes two or more layers, forming a second material sheet may include coextruding at least a first polymeric material and a second polymeric material. In at least some example embodiments, the first polymeric material comprises a base material including PET, PP, or any combination thereof. In at least some example embodiments, the second polymeric material comprises a thermal lamination layer. The thermal lamination layer may include PE, PP copolymer, or any combination thereof.

At 618, the method further includes forming a laminate sheet material including the first or metal sheet and the second or polymer sheet. In at least one example embodiment, the laminate sheet may be referred to as a composite material sheet. Forming the laminate sheet may include coupling or bonding the metal and polymeric sheets to one another. Coupling the metal and polymer sheets to one another may include the use of heat bonding, adhesives, solvents, or any combination thereof. In at least one example embodiment, other techniques may be used to form the laminate sheet. The polymer sheet may be directly coupled or bonded to the metal sheet, such as by heat bonding, or indirectly coupled or bonded to the metal sheet, such has by an adhesive disposed therebetween. In at least one example embodiment, the metal and polymer sheets are coupled via a combination of heat bonding and adhesive. In at least one example embodiment, the laminate material is prepared on a roll and subsequently cut into sheets.

Figure 7:
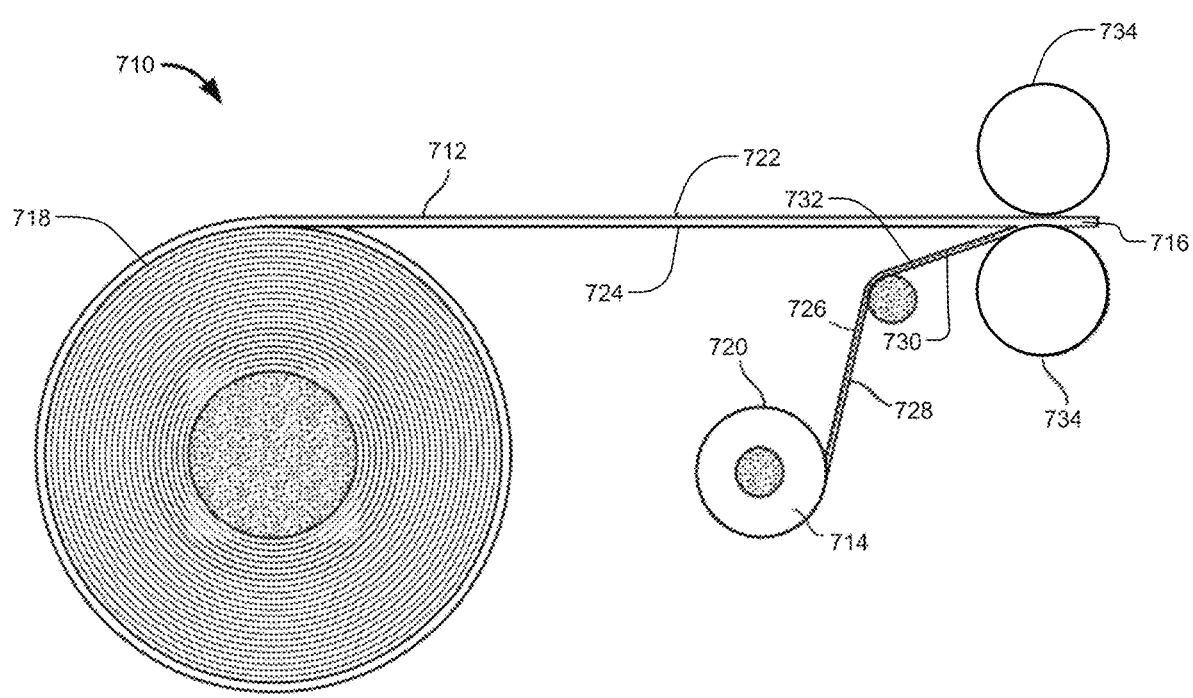
FIG. 7 is a schematic view of a method of manufacturing a laminate material according to at least one example embodiment.

FIG. 7 is a schematic view of a lamination process for forming a laminate sheet according to at least one example embodiment.

As shown in FIG. 7, a lamination process 710 includes joining a metal sheet material 712 and a polymer sheet material 714 to form a laminate sheet material 716. The metal sheet material 712 may be provided on a first roll 718. The polymer sheet material 714 may be provided on a second roll 720.

The metal sheet material 712 includes a first face 722 and a second face 724 opposite the first face 722. The polymer sheet material 714 includes a third face 726 and a fourth face 728 opposite the third face 726. The second face 724 of the metal sheet material 712 is disposed toward the third face 726 of the polymer sheet material 714.

In at least one example embodiment, the polymer sheet material 714 includes a first layer 730 comprising a first polymer material and a second layer 732 comprising a second polymer material. The first layer 730 includes the fourth face 728 and the second layer 732 includes the third face 726. Thus, the second layer 732 is disposed toward the metal sheet material 712.

As the metal and polymer sheet materials 712, 714 are dispensed from respective first and second rolls 718, 720, the third face 726 of the polymer sheet material 714 contacts the second face 724 of the metal sheet material 712. The metal and polymer sheet materials 712, 714 are pressed together by one or more press rollers 734. In at least one example embodiment, the press rollers are heated to facilitate thermal lamination of the polymer sheet material 714 (e.g., via the second layer 732) to the metal sheet material 712. The metal and polymer sheet materials 712, 714 are coupled to one another to form the laminate sheet material 716.

Additionally or alternatively, in at least one example embodiment, an adhesive may be disposed between the metal and polymer sheet materials 712, 714 before the second and third faces 724, 726 contact one another. In at least one example embodiment, the metal and polymer sheet materials 712, 714 having the adhesive disposed therebetween are pressed together, such as by press rollers 734, with or without the use of heat. The adhesive may be cured concurrently, such as via heated press rollers 734, or subsequent to passing through the press rollers 734. In at least one example embodiment, the laminate sheet material 716 is wound onto a roll for storage or transportation. The laminate sheet material 716 may be cut into individual sheets.

Returning to FIG. 6, at 620, the method may include applying additional exterior features. Exterior features may include text, ornamental designs, other indicia, functional features (e.g., protective features) to an outside surface of the lid. In at least some example embodiments, applying may include adhering a printed layer onto at least a portion of the outside surface, such as on a lid wall. In at least one example embodiment, applying may include printing directly on the outside surface. In at least one example embodiment, applying may include applying a coating on the outside surface. The coating may include an ink (e.g., an UV-curable ink), a varnish, and/or a second enamel (e.g., a clear coat). In at least one example embodiment, the coating may protect the metal portion of the lid, a label applied to the outer surface, and/or printed indicia on the outside surface.

With continued reference to FIG. 6, at 622, in at least one example embodiment, an enamel (e.g., enamel portion 416 of FIG. 4) may applied to the polymer of the laminate sheet material. In at least one example embodiment, the enamel is applied as a fluid. In at least one example embodiment, the enamel is applied by dipping at least a portion of the laminate sheet material in a bath of liquid enamel and subsequently curing the enamel such as by heating the enamel. In at least one example embodiment, the enamel is applied to a surface of the polymer sheet layer via a roller and subsequently curing the enamel, such as by heating the enamel. Heating the enamel may include placing the laminate sheet material including the enamel in an oven at a desired (or, alternatively predetermined) temperature for a desired (or, alternatively predetermined) period of time. In at least one other example embodiment, applying an enamel coating 622 is performed before applying exterior features 620.

At 626, the laminate material sheet, which may include an enamel coating, is separated into a plurality of laminate material portions. In at least some example embodiments, separating may include cutting (e.g., die cutting). In at least one example embodiment, a plurality of discs are blanked from the laminate material sheet. The polymer sheet layer may be flexible enough to withstand the separating process without substantially cracking, delaminating from the metal sheet layer, or wrinkling.

At 630, the method may include forming a lid (e.g., lid 104, lid 324, lid 410, or lid 530) from a portion of the laminate material sheet. In at least some example embodiments, forming may include stamping, pressing, hydroforming, or any combination thereof. The polymer sheet layer may be flexible enough to withstand the forming process without substantially cracking, delaminating from the metal sheet layer, or wrinkling.

In at least one example embodiment, forming further includes forming additional features. Additional features may include embossing and/or debossing text, ornamental designs, other indicia (e.g., a logo and/or a touch-identifiable pattern), or functional features (e.g., a grip-enhancing texture). The embossing and/or debossing may be formed concurrently with the forming the concave lid shape, such as while pressing the portion of the laminate material sheet to form the concave lid shape. In at least one example embodiment, the embossing and/or debossing may be performed in a separate operation, such as after forming the concave lid shape.

Figure 8:
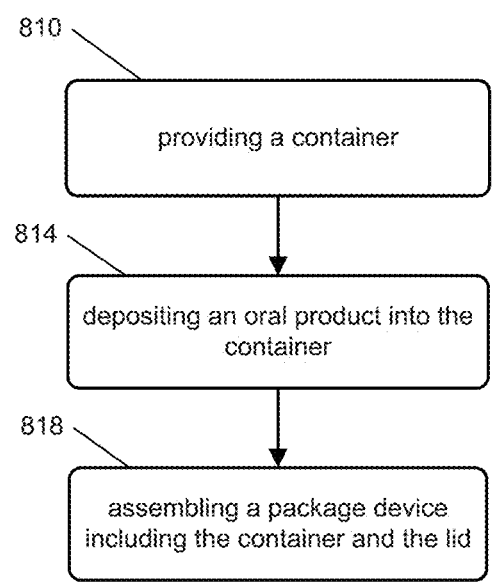
FIG. 8 is a flowchart depicting a method of assembling a packaged oral product according to at least one example embodiment.

FIG. 8 is a flowchart depicting a method of assembling a packaged oral product according to at least some example embodiments.

In at least one example embodiment, a method of assembling a packaged oral product may generally include providing a body at 810, depositing an oral product into the body at 814, and assembling a container at 818.

At 810, the method may include providing a body, such as the body 102 of FIGS. 1A-1E, the body 322 of FIG. 3B, or the body 510 of 5A. At 814, the method may further include depositing an oral product (e.g., oral product 106) into an interior region of the body. At 818, the method may further include assembling a container containing the oral product. Assembling the container may include securing the lid onto the body, such as by the process described in conjunction with FIGS. 2A-2C or the process described in conjunction with FIGS. 5A-5B. In at least one example embodiment, assembling the container may further include applying a seal to the container (e.g., 210 of FIG. 2A).

A number of embodiments of the invention have been described. Nevertheless, it will be understood that various modifications, permutations, additions, and sub-combinations thereof may be made without departing from the spirit and scope of the invention. Accordingly, other embodiments are within the scope of the following claims.

We claim:

1. A lid for a container body, the lid comprising:
  a wall defining a depression; and
  a skirt extending from a periphery of the wall, the skirt being configured to engage the container body to retain the lid on the container body, the skirt cooperating with the wall to define a cavity, the lid is formed from a laminate including a metal layer and a polymer layer on the metal layer, the polymer layer in contact with the metal layer on an entirety of the wall, the polymer layer being inside of the metal layer with respect to the cavity, both the metal layer and the polymer layer defining the depression, the polymer layer including polyester terephthalate (PET), wherein the polymer layer additionally includes polypropylene (PP), polyethylene (PE), or any combination thereof.

2. The lid of claim 1, wherein the polymer layer is configured to directly engage the container body and be in fluid communication with an interior region of the container body.

3. The lid of claim 1, wherein the metal layer includes tin, steel, stainless steel, aluminum, or any combination thereof.

4. The lid of claim 3, wherein the steel includes tin-free steel.

5. The lid of claim 1, wherein the metal layer includes tin-plated steel.

6. The lid of claim 1, wherein the polymer layer includes a first sublayer and a second sublayer, the second sublayer being coupled to the metal layer.

7. The lid of claim 6, wherein the second sublayer includes a thermal lamination material.

8. The lid of claim 6, wherein
  the first sublayer includes polyester terephthalate (PET) and additionally includes polyethylene (PE), polypropylene (PP), or a combination of PE and PP, and
  the second sublayer includes polyethylene (PE) or a PP copolymer.

9. The lid of claim 1, wherein the laminate further includes an enamel layer on a surface of the polymer layer such that the polymer layer is between the metal layer and the enamel layer, the enamel layer being configured to directly engage the container body and be in fluid communication with an interior region of the container body.

10. The lid of claim 9, wherein the enamel layer includes a phenolic, an epoxy, or an epoxy-phenolic.

11. The lid of claim 10, wherein the enamel layer includes the epoxy-phenolic.

12. The lid of claim 1, wherein the polymer layer is directly on the metal layer.

13. The lid of claim 1, further comprising:
  an adhesive layer between the metal layer and the polymer layer.

14. The lid of claim 1, further comprising a projection extending radially inwardly from the skirt, the projection being configured to engage the container body.

15. The lid of claim 14, wherein the projection is a circumferential projection extending continuously around an inside surface of the skirt.

16. A method of forming a lid for a container body of claim 1, the method comprising: preparing a laminate sheet by laminating a polymer sheet onto a metal sheet; separating a portion of the laminate sheet from a remainder of the laminate sheet; and forming the portion into the lid, including the wall and the skirt.

17. The method of claim 16, wherein the preparing includes heat bonding the polymer sheet to the metal sheet.

18. The method of claim 16, further comprising:
  providing the polymer sheet, the polymer sheet additionally including polypropylene (PP), a polyethylene (PE), or any combination thereof.

19. The method of claim 18, wherein
  the providing includes co-extruding a first polymeric sublayer and a second polymeric sublayer,
  the first polymeric sublayer includes PET and additionally PE, PP, or both PE and PP, and
  the second polymeric sublayer includes PE or a PP copolymer.

20. The method of claim 16, wherein the forming includes stamping, pressing, hydroforming, or any combination thereof.

21. The method of claim 16, further comprising:
  applying an enamel to the polymer sheet after the preparing, the enamel including a phenolic, an epoxy, or an epoxy-phenolic.

22. The method of claim 16, wherein the separating includes die cutting.

23. The method of claim 16, further comprising:
  providing the metal sheet prior to the preparing, the metal sheet having a thickness ranging from 0.0062 inches to 0.0141 inches.

* * * * *